United States Patent [19]
Schuler

[11] Patent Number: 5,685,297
[45] Date of Patent: Nov. 11, 1997

[54] FREEZE RESISTANT LIQUID FILLED FIRST STAGE SCUBA REGULATOR

[76] Inventor: Manfred Schuler, 17462 Wayne Ave., Irvine, Calif. 92714

[21] Appl. No.: 600,676

[22] Filed: Feb. 13, 1996

[51] Int. Cl.[6] .............................. A62B 9/02; F16K 31/122
[52] U.S. Cl. ................... 128/205.24; 128/204.26; 137/505.25; 137/882
[58] Field of Search ....................... 128/204.18, 205.24, 128/204.26; 137/505.25, 882, 883

[56] References Cited

U.S. PATENT DOCUMENTS

| | | | |
|---|---|---|---|
| 4,230,140 | 10/1980 | Hart | 137/81.2 |
| 5,097,860 | 3/1992 | Ferguson et al. | 137/78.1 |
| 5,190,030 | 3/1993 | Semeia | 128/204.26 |
| 5,379,761 | 1/1995 | Schuler | 128/205.24 |

Primary Examiner—V. Millin
Assistant Examiner—Eric P. Raciti
Attorney, Agent, or Firm—Walter A. Hackler

[57] ABSTRACT

A freeze resistant first stage pressure regulator for use with a high pressure source of breathable gas includes a housing and a yoke, for attaching said housing to a high pressure source of breathable gas along with a pressure regulated outlet, a valve seat and a piston. A spring is provided for biasing the piston in order to effect a regulated valve opening between the piston and the valve seat and provide a pressure regulated supply of breathable gas to the pressure regulated outlet. The spring, piston and valve seat are all sealed within the housing. An antifreeze liquid is sealed within the housing for excluding contact of said spring and piston with ambient water; and a pressure transfer device, disposed in a wall of the housing and in fluid communication with the antifreeze liquid is provided for equalizing pressure between the ambient water and said antifreeze liquid.

6 Claims, 3 Drawing Sheets

5,685,297

FREEZE RESISTANT LIQUID FILLED FIRST STAGE SCUBA REGULATOR

The present invention is addressed to self-contained breathing systems, such as those used in SCUBA division equipment, and more particularly, relates to a first stage pressure regulator and apparatus for modification of existing first stage pressure regulation in order to provide enhanced safety features.

Typically, SCUBA divers utilize a high pressure source of breathable gas at a relatively high pressure which may exceed 3,000 psi.

The breathable gas, or air, is typically reduced in pressure by a first stage regulator to a constant intermediate pressure of about 140 psi. The first stage regulator is mounted directly on the high pressure source of air and the intermediate pressure air is applied to a second stage regulator which provides air to the diver at a usable pressure.

For safety purposes, the first stage regulator commonly may have two intermediate pressure air outlets which are in turn coupled to two separate second stage regulators and associated mouthpiece. The two outlets are both dependent on a single regulator valve system for a common supply of intermediate pressure air. Second stage SCUBA regulators for use in combination with the first stage regulator, in accordance with the present invention, are generally well known and described, for example, in U.S. Pat. No. 5,259,375 to Schuler, entitled: "Second Stage SCUBA Regulator With Balanced Piston Volume Control."

As pointed out in U.S. Pat. No. 5,097,860, a disadvantage of present day first stage regulators arises from the fact that they are susceptible to icing and corrosion from the impurities contained in ambient water, which decreases the useful life of the regulators and increases the maintenance cost thereof.

Such icing is a result of cooling of the regulator mechanism due to expansion of compressed air therethrough.

Heretofore, most first stage regulators include ports allowing communication of ambient water with internal mechanisms in order to equalize pressure therebetween. An exception is U.S. Pat. No. 5,097,860 which utilizes a diaphragm in order to prevent internal mechanism of the regulator from being exposed to ambient water.

More specifically, in accordance with U.S. Pat. No. 5,097,860, the diaphragm constitutes an imperforate, force transfer member in an attempt to seal the piston from direct contact with the ambient water to reduce the likelihood of freezing and corrosion of the working parts of the regulator.

However, total isolation is not effected because the chamber 64 is open to ambient water through a transverse opening 84 in tube 82 and a relieve valve 86. Hence, entrance of moisture into the chamber 64 is unavoidable, along with subsequent freezing therein.

U.S. Pat. No. 4,230,140 attempts to seal the inner mechanism of a first stage SCUBA regulator through the use of a low temperature silicon grease which is provided in and around the biasing spring in order to restrict the flow of water into the mechanism in order to prevent malfunction due to icing and to isolate the mechanism from sand, silt, coral and other particulate matter having deleterious effects upon rubber seals and other parts of the mechanism.

However, maintenance of the regulator is difficult due to the presence of the silicone grease In addition, complete packing of the silicone grease in a chamber containing the spring is difficult, resulting in voids. The voids, being compressible, allow ambient water to enter the chamber during operation and migrate through the grease to the biasing spring where freezing thereof can interfere with its operation.

Further, because no seal is provided, the silicone grease will eventually flush out of the regulator, particularly if it is stored and becomes heated. If sufficiently heavy silicone grease is provided to prevent seeping, such heavy grease can affect the operation of the valve.

Yet another approach to the icing problem is set forth in U.S. Pat. No. 5,379,761 which utilizes two independent regulated pressure outlets so that if icing occurs in one, the other is operable to deliver regulated breathable gas.

The first stage regulator in the system provided by the present invention provides a degree of safety heretofore never provided by a single first stage regulator through the use of totally sealed internal spring chamber. That is, no communication with ambient water is possible, thus eliminating any possible icing of internal mechanisms due to entry and freezing of ambient water.

SUMMARY OF THE INVENTION

In accordance with the present invention, the freeze resistant first stage pressure regulator for use with a high pressure source of breathable gas generally includes a housing and means for attaching the housing to a high pressure source of breathable gas. A pressure regulated outlet is provided along with a valve seat and piston. A spring provides means for biasing the piston in order to effect a regulated valve opening between the piston and valve seat in order to provide a pressure regulated supply of breathable gas through the pressure regulated outlet.

The spring, piston, valve are all disposed within the housing and the spring may be deposed in a separate spring chamber along with antifreeze liquid, which is sealed within the housing and spring chamber, for excluding contact of the spring and exposed piston with ambient water.

A pressure transfer device, or means disposed in a wall of the housing and include communication with the antifreeze liquid provides a means for equalizing pressure between the ambient water and the antifreeze liquid.

In this manner, ambient water is prevented from entering the internal mechanisms of the regulator, namely, the chamber containing the spring and piston. This prevents the accumulation of moisture therein which can cause ice crystals upon cooling of the regulator during expansion of gas from a high pressure source providing breathable gas to the first stage regulator and delivered as intermediate pressure air to a second stage regulator, the latter not being a part of the present invention.

Additionally, other contaminants such as silt or coral particles are prevented from entering the first stage pressure regulator in accordance with the present invention.

More particularly, the regulator in accordance with the present invention may include a pressure transfer device or means which includes a flexible diaphragm disposed with one side thereof exposed to the antifreeze liquid and another side exposed to the ambient water. In this instance, the diaphragm provides a barrier between the ambient water and the antifreeze liquid, while at the same time its flexible characteristic enables pressure equalization between the ambient water and the antifreeze liquid.

In an alternative embodiment of the present invention, the pressure transfer device or means may include a piston disposed with one side thereof exposed to the antifreeze liquid and another side exposed to the ambient water. In this instance, movement of the piston accommodates, or equalizes, pressure between the ambient water and the antifreeze liquid within the housing.

Also, in accordance with the present invention, there is provided an improvement for existing first stage pressure regulators which include, in combination, antifreeze liquid sealed within a spring chamber of the housing for excluding contact of the spring with ambient water and a pressure transfer device, or means, disposed in the wall of the spring chamber and include communication with the antifreeze liquid for equalizing pressure between the ambient water and the antifreeze liquid means. As hereinabove recited, this pressure transfer device, or means, may include a diaphragm or a piston as an active element for equalizing the pressure.

BRIEF DESCRIPTION OF THE DRAWINGS

The advantages and features of the present invention will be better understood by the following detailed description when considered in conjunction with the accompanying drawings, in which.

DETAILED DESCRIPTION

Figure 1:
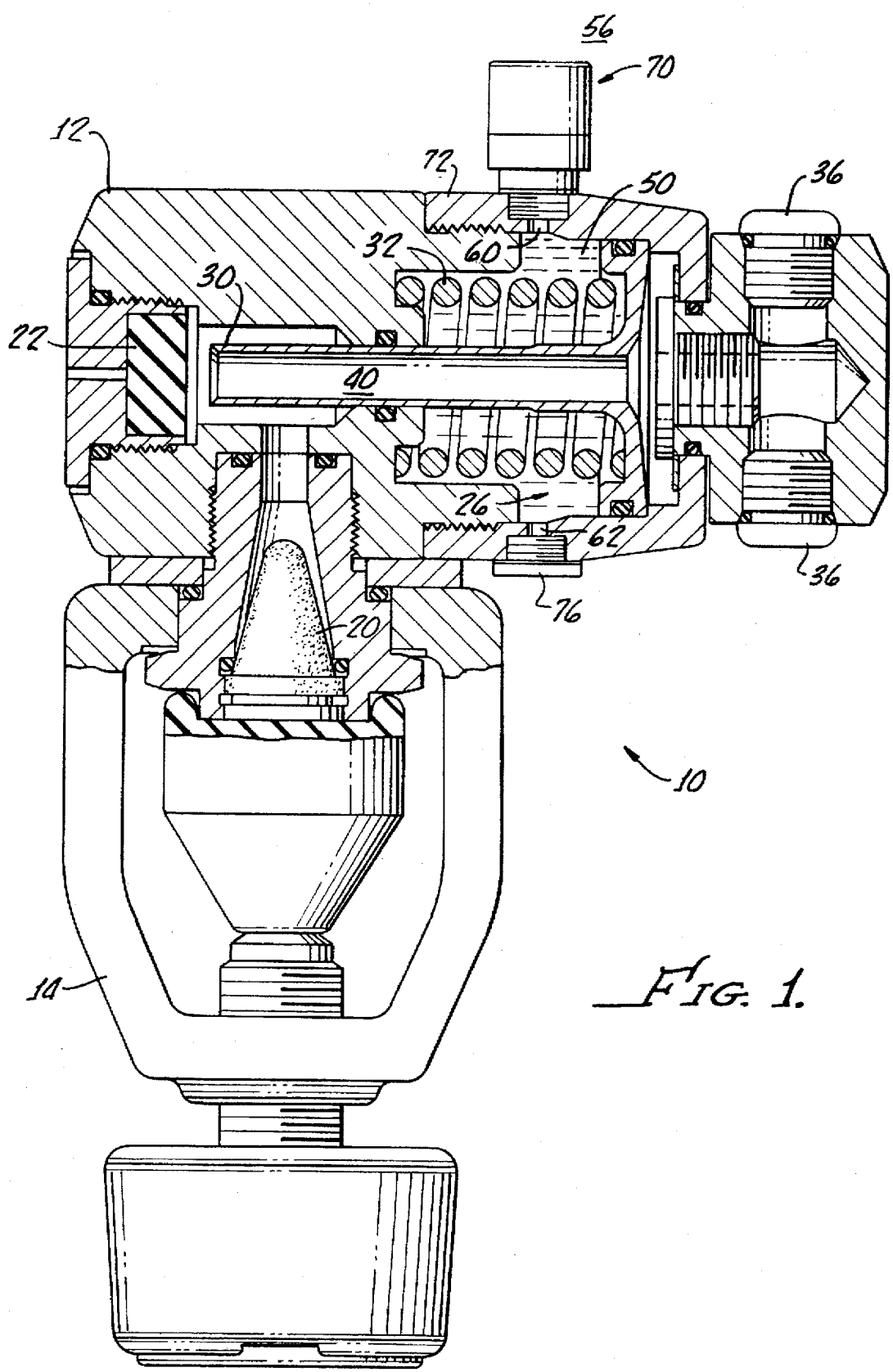
FIG. 1 is a cross-sectional view of one embodiment of the present invention in cross section generally showing a freeze resistant first stage pressure regulator having therein as an improvement an antifreeze filled spring chamber and a pressure transfer device which provides means for equalizing pressure between ambient water and the antifreeze liquid disposed within the regulator.

Turning now to FIG. 1 there is generally shown a freeze resistant first stage pressure regulator 10 in accordance with the present invention having a housing 12 with a yoke 14 which provides a means for attaching the housing 12 to a high pressure source of breathable gas (not shown), a filter 20 prevents contamination from entering the housing 12 from the high pressure source of breathable gas which is introduced to a seat 22.

Generally disposed within a spring chamber 26 is a piston 30 and a spring 32. Conventional drawing nomenclature is provided for numerous O-ring seals disposed within the regulator 10 and a description of each seal is omitted here for clarity purposes.

A pair of pressure regulated outlets 36 are in fluid communication with the piston 30 via a piston hollow center 40 to the valve seat 22. The spring acts on the piston in order to effect a regulated valve opening between an end 44 of the piston and the valve seat 22 which provides a pressure regulated supply of breathable gas to the pressure regulated outlet 36.

Importantly, antifreeze liquid 50 such as, for example, ethylene glycol, is disposed within the chamber 26 surrounding the spring and piston which provides a means for excluding contact of the spring and the piston with ambient water 56.

The housing 12 may include access openings 60, 62, as shown in FIG. 1. In accordance with the present invention, a pressure transfer device, or means, 70 is disposed in a wall 72 of the housing 12 and is in fluid communication with the antifreeze liquid 50 therein as hereinafter described in greater detail.

The other opening 60 is sealed by a plug 76 to prevent leakage of antifreeze liquid 50 from the chamber 26. Hence, the antifreeze liquid is sealed within the chamber 26 in the housing and the pressure transfer device provides a means for equalizing pressure between the ambient water and the antifreeze liquid as hereinafter described.

Figure 2:
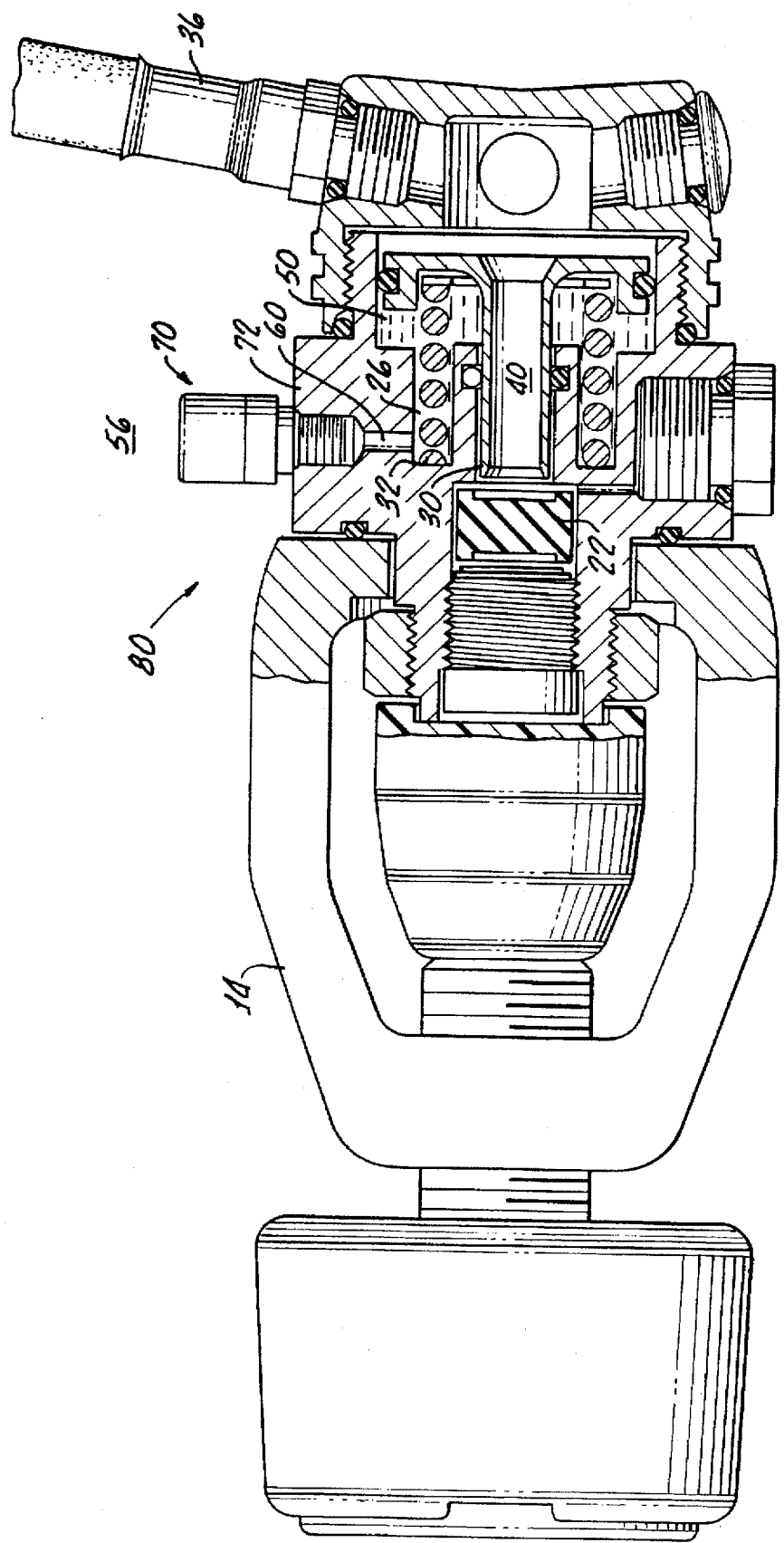
FIG. 2 is an embodiment of a regulator in accordance with the present invention.

FIG. 2 shows an alternative embodiment of the present invention in which a differently configured regulator 80 is shown. It should be appreciated that common numerical references as shown in FIG. 2 refer to equivalent or substantially the same elements as the numerical references recited in the specification and indicated in FIG. 1.

Figure 3:
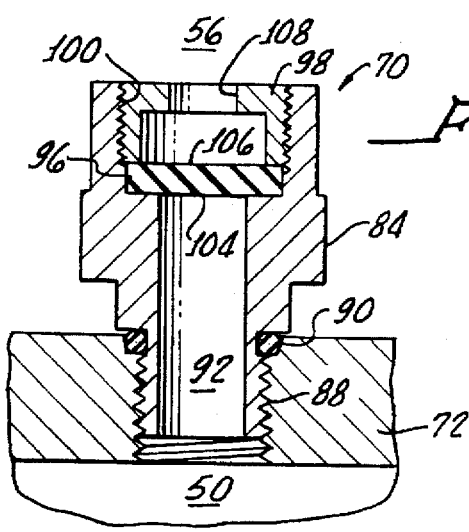
FIG. 3 is a cross-sectional view of a pressure transfer device in accordance with the present invention incorporating a diaphragm, or membrane.

Turning now to FIG. 3, there is shown in cross-sectional detail the pressure transfer device, or equalizer 70, which generally includes a hollow body portion 84 inserted in and through the housing wall 72 by threads 88 with an O-ring 90 providing a seal therebetween.

A central channel, or bore, 92 is in fluid communication with the chamber 26 and antifreeze liquid 50, a flexible diaphragm, or membrane 96 is sealed within the body 84 by means of a cap 98 screwed into the body 84 by threads 100.

One side of 104 of the diaphragm 96 is exposed to the antifreeze liquid 50 through the bore 92 and another side of 106 is exposed to ambient water through an opening 108.

As a diver progresses deeper into water, carrying the regulator 10, pressure of the ambient water 56 increases, thus pushing the diaphragm 96 and providing equal pressure on the antifreeze liquid 50 within the chamber 26 of the housing 12.

The diaphragm may be made from any suitable material such as, for example, neoprene, rubber, silicon or plastic.

Figure 4:
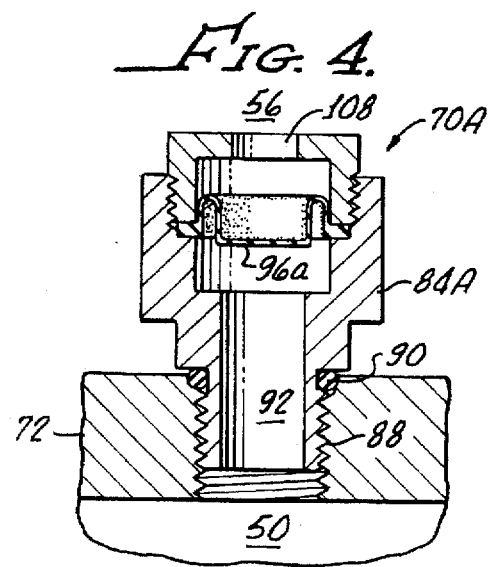
FIG. 4 is a cross-sectional view of an alternative embodiment of the pressure transfer device in accordance with the present invention generally showing a U-shaped diaphragm.

Turning now to FIG. 4, there is shown an alternative embodiment 70a with a pressure equalized, with common character references indicating identical or substantially similar parts as shown in FIG. 3.

In this embodiment the diaphragm 96A is U-Shaped which can provide for greater positive and negative variations in pressure between the ambient water 56 and the antifreeze liquid 50 within the housing chamber 26.

Figure 5:
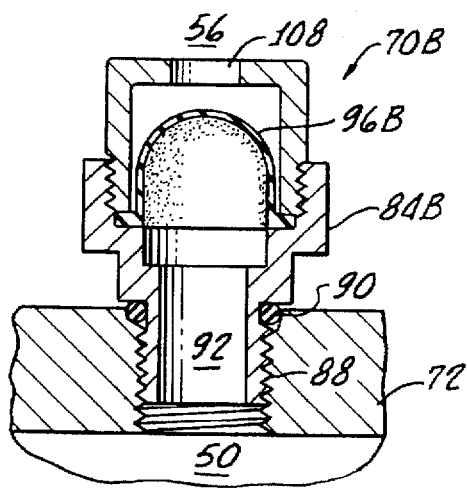
FIG. 5 is a cross-section of a pressure transfer device in accordance with the present invention generally showing a bell-shaped diaphragm.

Similarly, as shown in FIG. 5, the pressure regulator 70b may utilize a domed-shaped diaphragm 96b. Other configured diaphragms (not shown) may be utilized.

Figure 6:
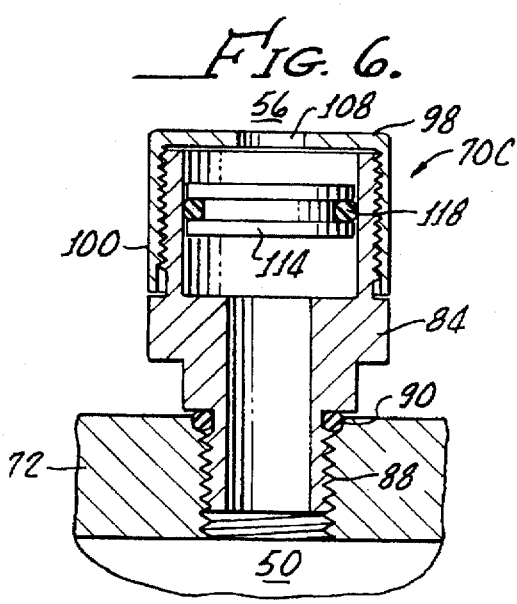
FIG. 6 is a cross-sectional view of a pressure transfer device in accordance with the present invention generally showing a movable piston for equalizing pressure between the ambient water and the antifreeze liquid disposed within the regulator.

Next turning to FIG. 6, yet another embodiment 70c of the pressure equalizer is shown in which a movable piston is disposed within the body 84 for movement in response to a difference in pressure between the ambient water 56 and the antifreeze liquid 50, sealing of the piston 114 within the body 84 as provided by an O-ring 118.

Although there has been hereinabove described a freeze resistant first stage pressure regulator, an improvement in accordance with the present invention, for the purpose of illustrating the manner in which the invention is used to advantage, it should be appreciated that the invention is not limited thereto. Accordingly, any and all modifications, variations or equivalent arrangements which may occur to those skilled in the art, should be considered to be within the scope of the present invention as defined in the appended claims.

What is claimed is:

1. A freeze resistant first stage pressure regulator for use with a high pressure source of breathable gas, the regulator comprising:

a housing;

means for attaching said housing to a high pressure source of breathable gas;

a pressure regulated outlet;

a valve seat;

a piston;

spring means for biasing said piston in order to effect a regulated valve opening between the piston and the valve seat and provide a pressure regulated supply of breathable gas to said pressure regulated outlet, said spring means, piston and valve seat being sealed within said housing;

antifreeze liquid means, sealed within said housing for excluding contact of said spring means and piston with ambient water; and pressure transfer means, disposed in a wall of said housing and in fluid communication with said antifreeze liquid means, for equalizing pressure between the ambient water and said antifreeze liquid means, said pressure transfer means comprising a flexible diaphragm disposed with one side thereof exposed to said antifreeze liquid means and another side exposed to said ambient water.

2. The regulator according to claim 1 further comprising:

a hollow body;

means for removably attaching said hollow body through a wall in said housing; and means for removably mounting said diaphragm within said hollow body.

3. A freeze resistant first stage pressure regulator for use with a high pressure source of breathable gas, the regulator comprising:

a housing having a spring chamber therein;

means for attaching said housing to a high pressure source of breathable gas;

a pressure regulated outlet;

a valve seat;

a piston;

spring means, disposed in said spring chamber, for biasing said piston in order to effect a regulated valve opening between the piston and the valve seat and provide a pressure regulated supply of breathable gas to said pressure regulated outlet, said spring means, piston and valve seat being sealed within said housing;

antifreeze liquid means, sealed within said spring chamber, for excluding contact of said spring means with ambient water; and pressure transfer means, disposed in a wall of said housing and in fluid communication with said antifreeze liquid means, for equalizing pressure between the ambient water and said antifreeze liquid means, said pressure transfer means comprising a flexible diaphragm disposed with one side thereof exposed to said antifreeze liquid means and another side exposed to said ambient water.

4. The regulator according to claim 3 further comprising:

a hollow body;

means for removably attaching said hollow body through a wall in said housing to the spring chamber;

means for removably mounting said diaphragm within said hollow body.

5. In a first stage SCUBA pressure regulator having a housing with a spring chamber and a spring disposed therein for providing a pressure regulated supply of air, an improvement comprising:

antifreeze liquid means, sealed within said spring chamber, for excluding contact of said sprig with ambient water; and pressure transfer means, disposed in a wall of said spring chamber and in fluid communication with said antifreeze liquid means, for equalizing pressure between the ambient water and said antifreeze liquid means, said pressure transfer means comprising a flexible diaphragm disposed with one side thereof exposed to said antifreeze liquid means and another side exposed to said ambient water.

6. The regulator improvement according to claim 5 further comprising:

a hollow body;

means for removably attaching said hollow body through a wall in said housing; and means for removably mounting said diaphragm within said hollow body.

* * * * *